(12) United States Patent
Chen et al.

(10) Patent No.: US 8,125,787 B2
(45) Date of Patent: Feb. 28, 2012

(54) FRAME ASSEMBLY FOR TOUCH SCREEN

(75) Inventors: Jung-Yu Chen, Taipei (TW);
Chien-Ping Sun, Taipei (TW); Yi-Te Chien, Taipei (TW); Wei-Lin Wang, Taipei (TW)

(73) Assignee: ET&T Technology Co., Ltd., Taipei (TW)

( * ) Notice: Subject to any disclaimer, the term of this patent is extended or adjusted under 35 U.S.C. 154(b) by 986 days.

(21) Appl. No.: 12/104,462

(22) Filed: Apr. 17, 2008

(65) Prior Publication Data

US 2009/0262512 A1 Oct. 22, 2009

(51) Int. Cl.
*H05K 5/00* (2006.01)

(52) U.S. Cl. ......... 361/752; 361/741; 361/736; 361/759

(58) Field of Classification Search .......... 349/149–151, 349/58, 59, 60; 361/741, 730, 759, 736; 40/711

See application file for complete search history.

(56) References Cited

U.S. PATENT DOCUMENTS

| | | | | |
|---|---|---|---|---|
| 5,246,304 A * | 9/1993 | John et al. | ...... | 403/403 |
| 5,377,080 A * | 12/1994 | Lin | ...... | 361/756 |
| 5,398,164 A * | 3/1995 | Goodman et al. | ...... | 361/752 |
| 5,398,376 A * | 3/1995 | Pollack | ...... | 16/225 |
| 6,144,552 A * | 11/2000 | Whitcher et al. | ...... | 361/679.3 |
| 6,477,039 B2 * | 11/2002 | Tajima | ...... | 361/679.21 |
| 2005/0068486 A1 * | 3/2005 | Ono | ...... | 349/150 |
| 2006/0227258 A1 * | 10/2006 | Lee | ...... | 349/58 |
| 2008/0192168 A1 * | 8/2008 | Sudo | ...... | 349/58 |

* cited by examiner

*Primary Examiner* — Tuan T Dinh
*Assistant Examiner* — Steven Sawyer
(74) *Attorney, Agent, or Firm* — Leong C. Lei

(57) ABSTRACT

The frame assembly mainly contains a number of linear edge members and a number of L-shaped corner members end-to-end joining the edge members by a number of connection pieces into a rectangular frame surrounding a touch panel. Both the edge and corner members have a C-shaped cross section with a space inside for holding circuit boards of the touch panel. The circuit boards of the corner and edge members are aligned so that their connectivity by matching connectors is easily established when putting the frame assembly together.

12 Claims, 11 Drawing Sheets

FRAME ASSEMBLY FOR TOUCH SCREEN

TECHNICAL FIELD OF THE INVENTION

The present invention generally relates to touch screens, and more particularly to a frame assembly for touch screens that could be easily assembled and disassembled.

DESCRIPTION OF THE PRIOR ART

Touch screens, due to their intuitive way of operation, have gained wide popularity these days. Conventionally, the panel and circuit boards of a touch screen are completely assembled in a frame in the factory before shipping to customers. With the frames, the touch screens take up more space and therefore a higher transportation cost is incurred.

On the other hand, the touch screens have various dimensions to meet customer demands. This versatility has made the storage and transportation of the assembled touch screens more complicated and difficult.

SUMMARY OF THE INVENTION

Accordingly, a frame assembly for the touch screens is provided herein so as to achieve enhanced production flexibility, simplicity, and cost reduction.

The frame assembly mainly contains a number of linear edge members and a number of L-shaped corner members end-to-end joining the edge members by a number of connection pieces into a rectangular frame surrounding a touch panel. Both the edge and corner members have a C-shaped cross section with a space inside for holding circuit boards of the touch panel. The circuit boards of the corner and edge members are aligned so that their connectivity by matching connectors is easily established when putting the frame assembly together.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
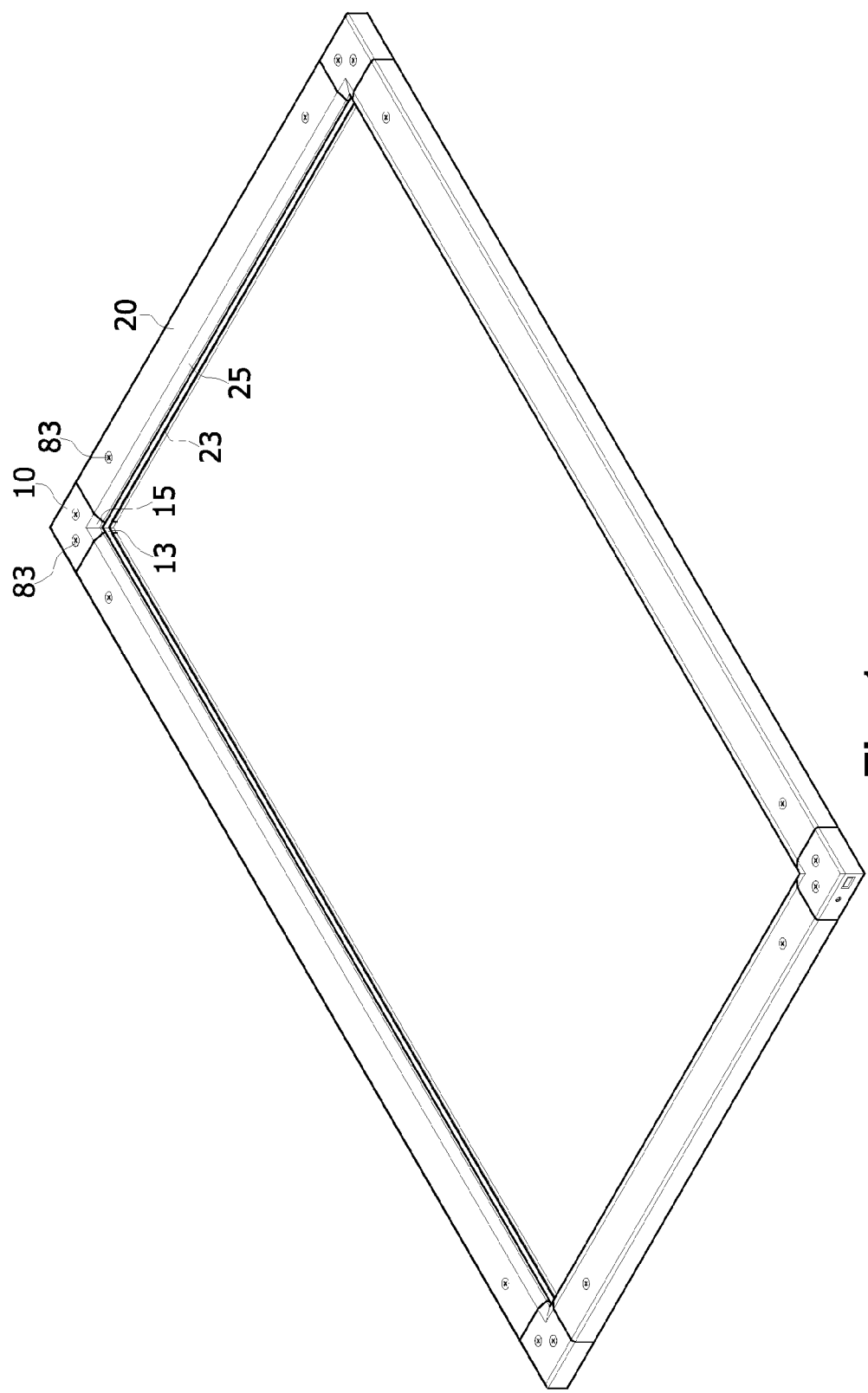
FIG. 1 is a perspective-view diagram showing a frame assembly according to an embodiment of the present invention.
Figure 2:
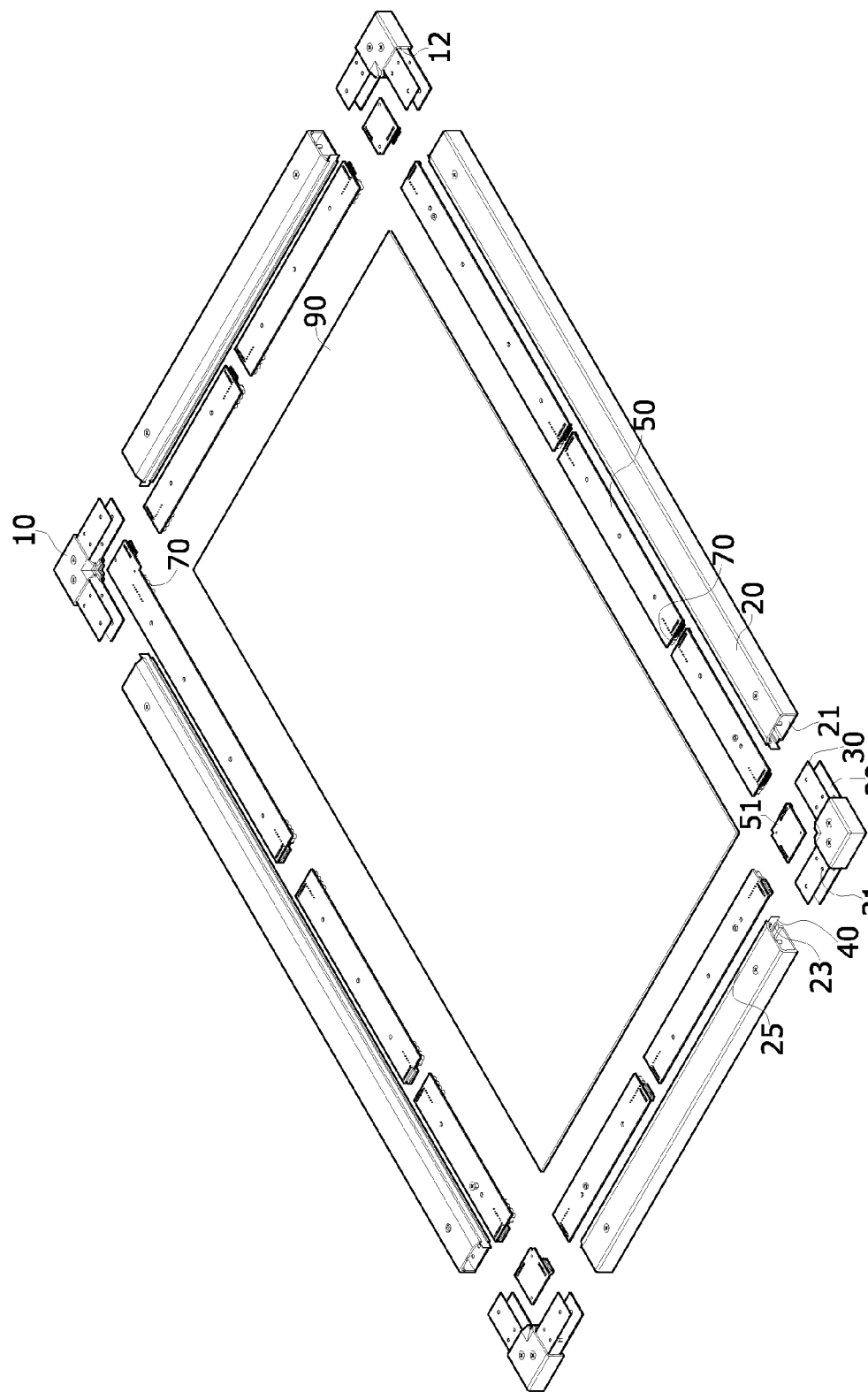
FIG. 2 is a perspective-view diagram showing the various components of the frame assembly of FIG. 1.

As shown in FIGS. 1 and 2, a frame assembly according to an embodiment of the present invention mainly contains a number of linear edge members 20 and a number of L-shaped corner members 10 end-to-end joining the edge members 20 by a number of flat connection pieces 30 into a rectangular frame surrounding a space 21.

Figure 4:
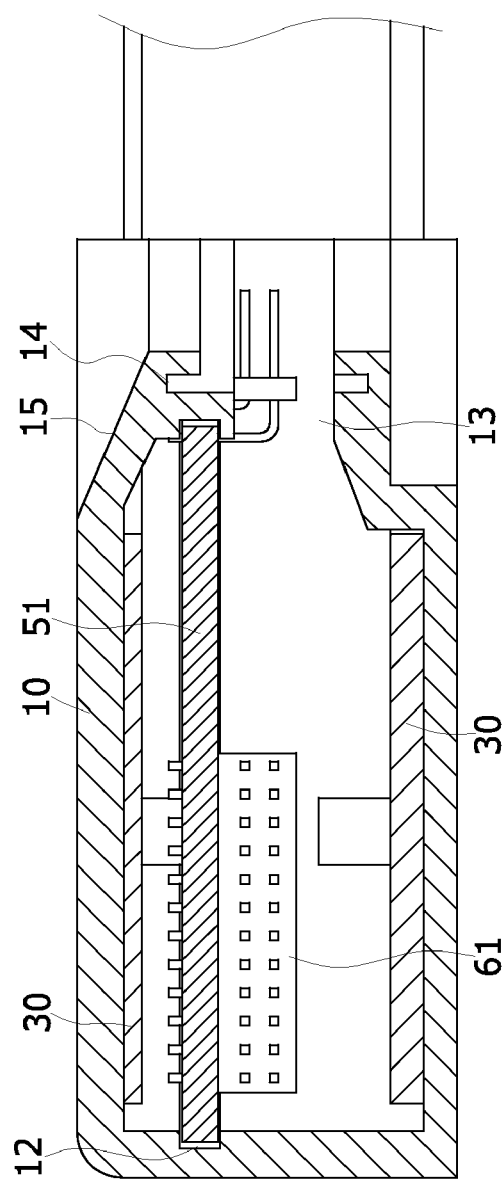
FIG. 4 is a cross-sectional-view diagram showing a corner member of the frame assembly of FIG. 1.
Figure 6:
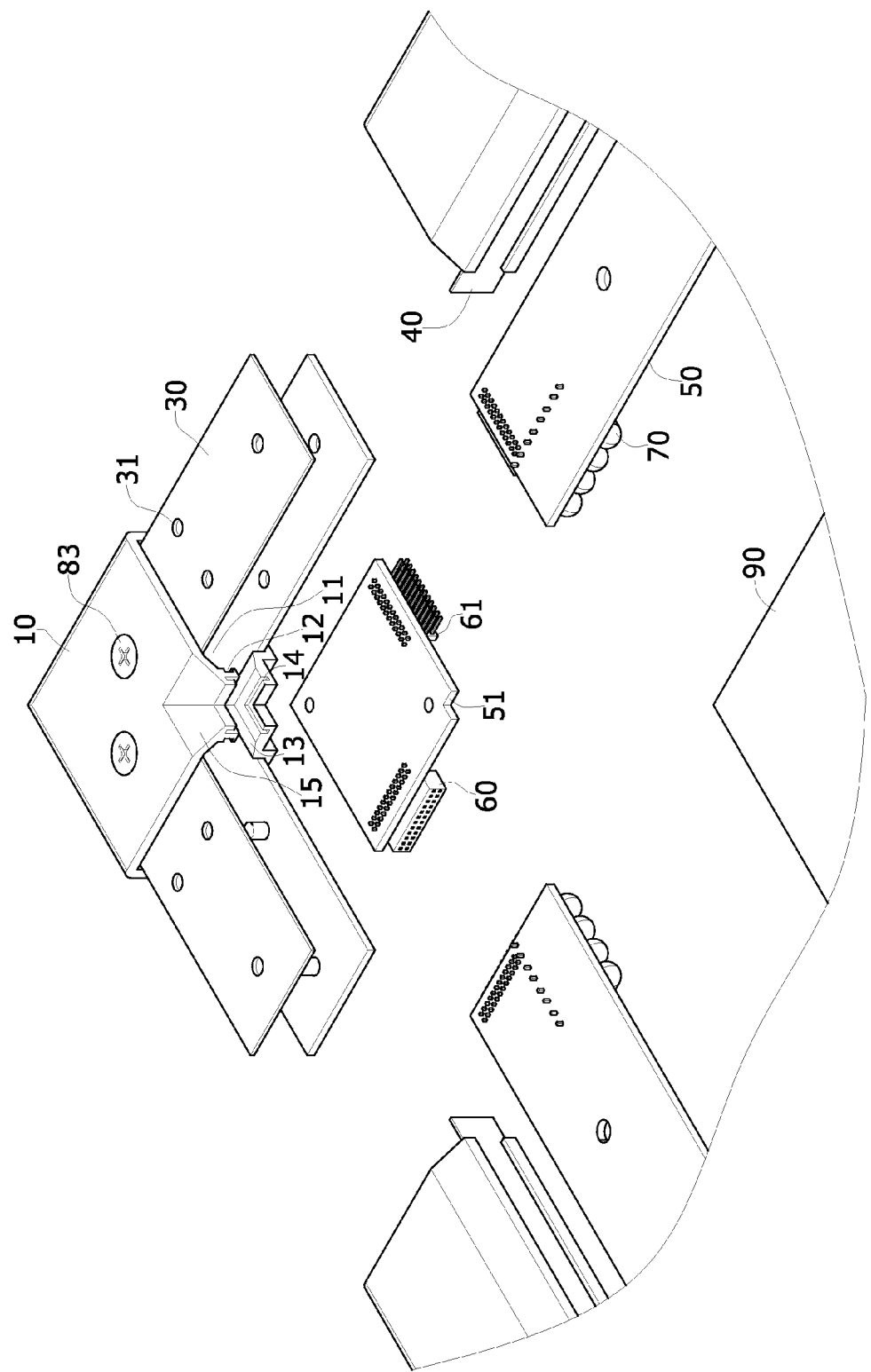
FIG. 6 is a perspective-view diagram showing the circuit board of a corner member connected to two circuit boards of two adjacent edge members.
Figure 7:
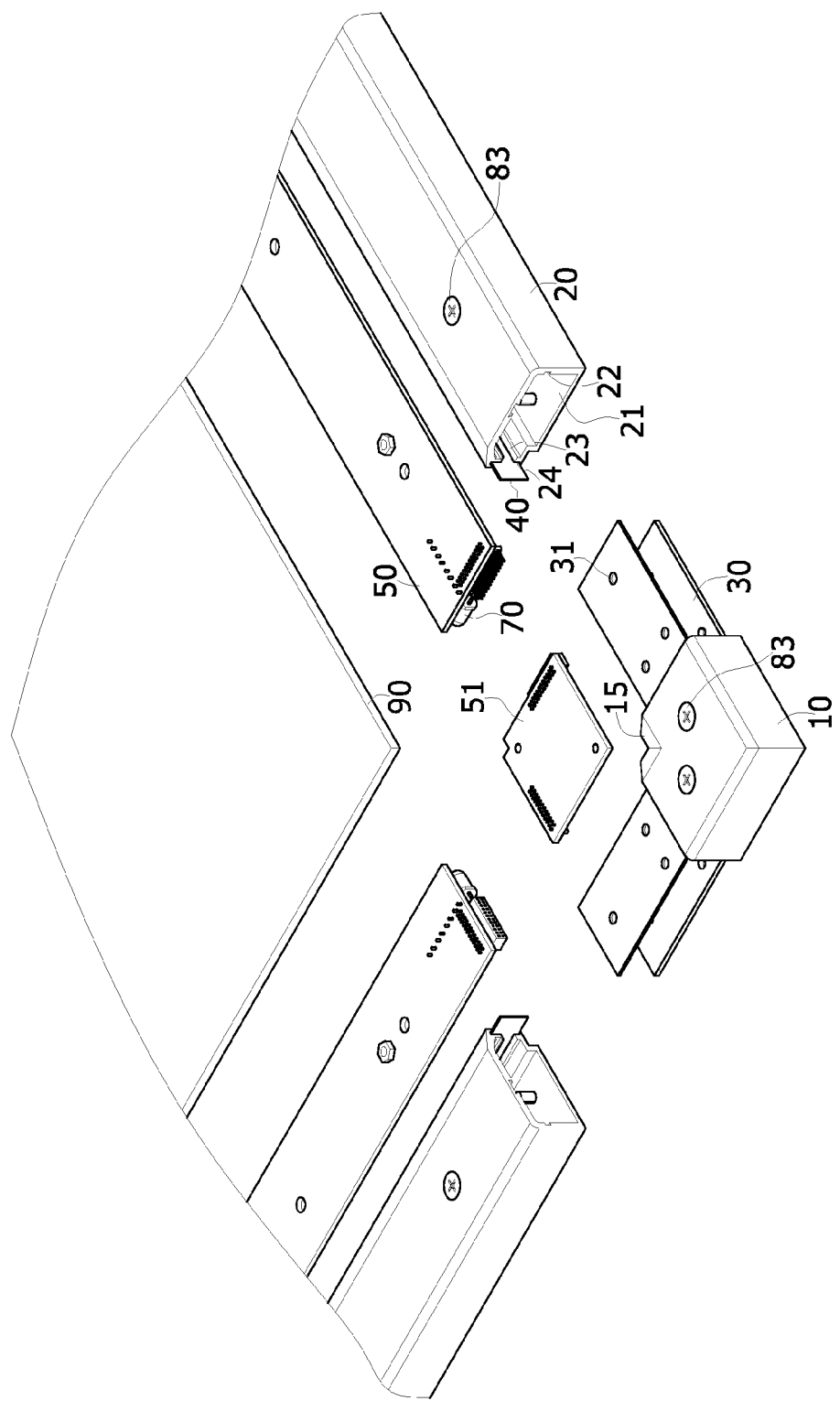
FIG. 7 is a perspective-view diagram showing the circuit board of a corner member connected to two circuit boards of two adjacent edge members from another angle.

As further shown in FIGS. 6 and 7, each corner member 10, forming a right-angled corner or a slightly rounded corner, has a C-shaped cross section with a L-shaped space 11 inside and an L-shaped lateral opening 13 along the corner member 10's L-shaped inner side 15 for receiving a corner of a touch screen 90. The inner side 15 has a L-shaped top half and a L-shaped bottom half (both not numbered) closing in towards each other from above and beneath the opening 13, respectively. On a bottom surface of the inner side 15's top half and on a top surface of the inner side 15's bottom half, there are matching L-shaped vertical troughs 14, respectively. The two vertical troughs 14 are for holding transparent and linear covering plates 40 extended from adjacent edge members 20. On an inner surface of the top half of the inner side 15, there is an L-shaped lateral trough 12. As shown in FIG. 4, across the space 11, there is another matching L-shaped lateral trough 12 along an inner surface of the outer side (not numbered) of the corner member 10. The two lateral troughs 12 are for holding a circuit board 51 inside the space 11.

Figure 3:
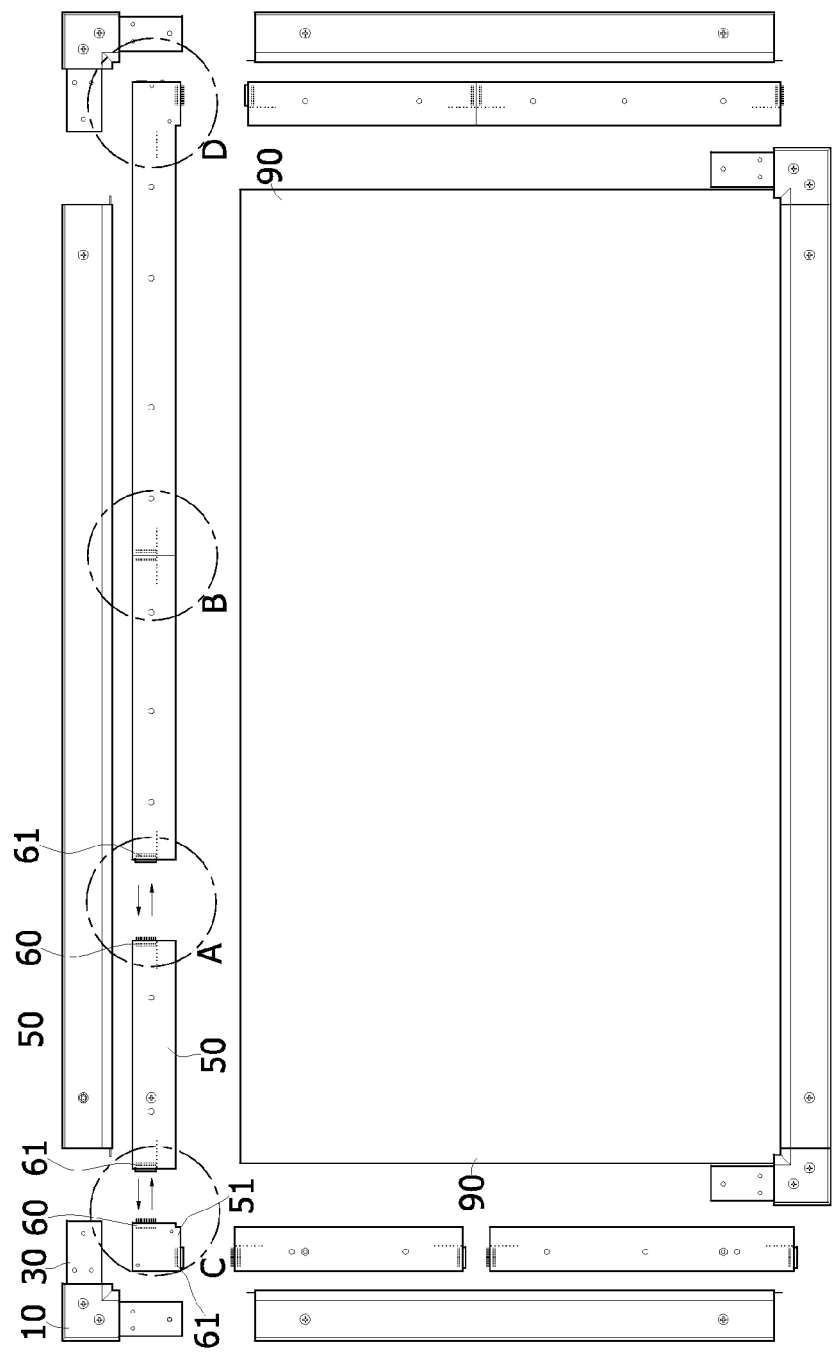
FIG. 3 is a front-view diagram showing the various components of the frame assembly of FIG. 1 and particularly the connection of circuit boards.
Figure 5:
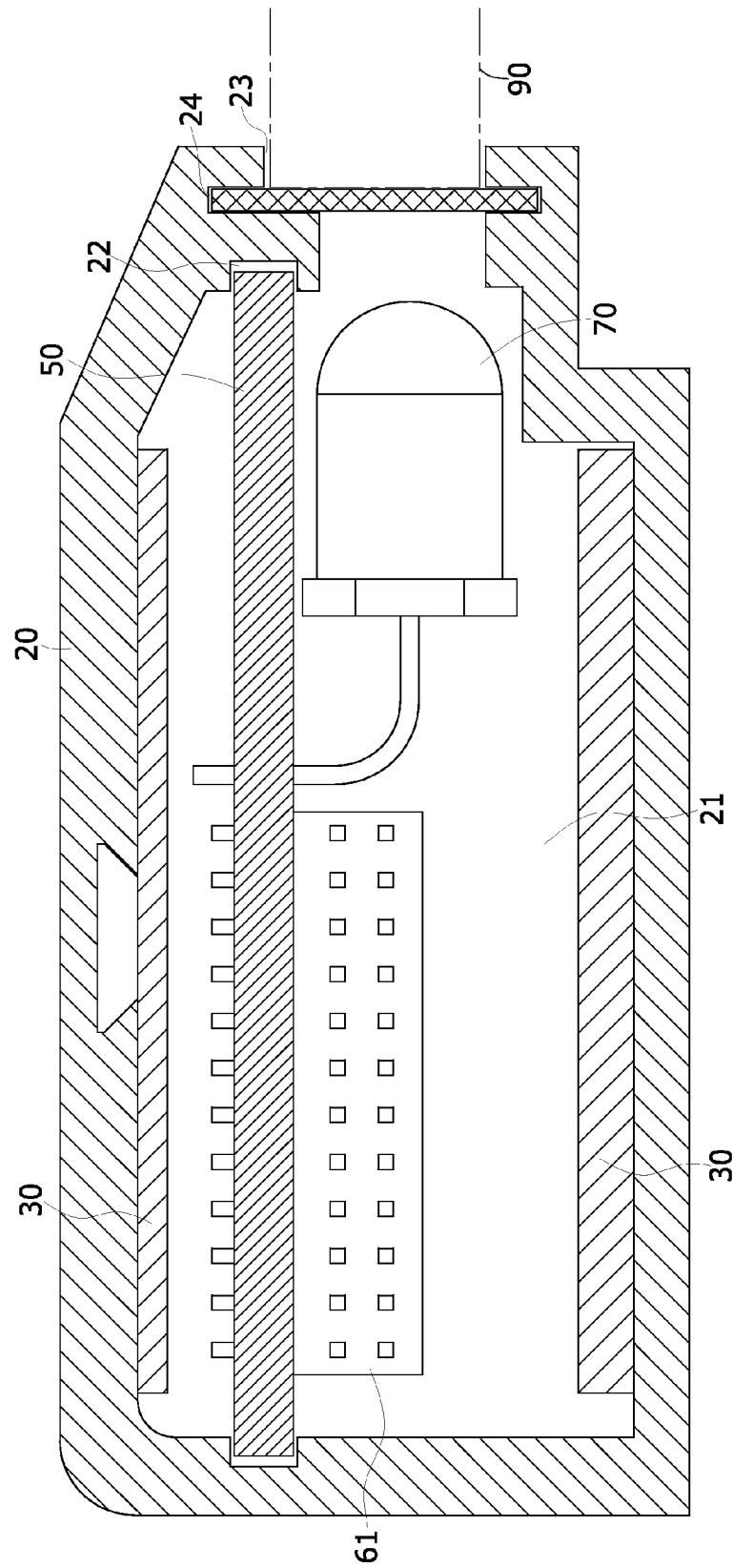
FIG. 5 is a cross-sectional-view diagram showing an edge member of the frame assembly of FIG. 1.

As shown in FIGS. 2, 3, and 7, each edge member 20 has a C-shaped cross section with a linear space 21 inside and a linear lateral opening 23 along the edge member 20's linear inner side 25 for receiving an edge of the touch screen 90. The inner side 25 has a linear top half and a linear bottom half (both not numbered) closing in towards each other from above and beneath the opening 23, respectively. On a bottom surface of the inner side 25's top half and on a top surface of the inner side 25's bottom half, there are matching linear vertical troughs 24, respectively. The two vertical troughs 24 are for holding a covering plate 40 that seals the opening 23 of an edge member 20. On an inner surface of the top half of the inner side 25, there is a linear lateral trough 22. As shown in FIG. 5, across the space 21, there is another matching linear lateral trough 22 along an inner surface of the outer side (not numbered) of the edge member 20. The two lateral troughs 22 are for holding a circuit board 50 inside the space 21.

The edge members 20 and the corner members 10 could be made of aluminum and formed by extrusion. They could also be made of a plastic material and formed by injection molding. The lateral troughs 22 and 12 of the edge members 20 and the corner members 10 are matched in terms of position and cross-sectional shape. Similarly, the vertical troughs 24 and 14 of the edge members 20 and the corner members 10 are matched in terms of position and cross-sectional shape.

As shown in FIGS. 2, 3, and 6, the connection pieces 30 are L-shaped and match the shape of the corner members 10 so that they can be fitted in the spaces 11 of the corner members 10 and the two legs (not numbered) of the connection pieces 30 are extended outside the corner members 10. As illustrated in FIG. 6, each connection piece 30 has a number of through holes 31 so that the connection piece 30 could be fixedly joined to a corner member 10 by a number of fastening elements 83 (e.g., screws). Similarly, each leg of a connection piece 30 could be threaded in the space 21 of an edge member 20 and fixedly joined to the edge member 20 by a number of fastening elements 83. As shown in FIGS. 4 and 5, each corner member 10 is configured with two connection pieces 30, one along a top inner surface and one along a bottom inner surface of the corner member 10. In an alternative embodiment each corner member 10 is configured with a single connection piece 30, if a single connection piece 30 provides enough connection reliability. In another alternative embodiment, each L-shaped connection piece 30 is replaced by two linear pieces.

Figure 8:
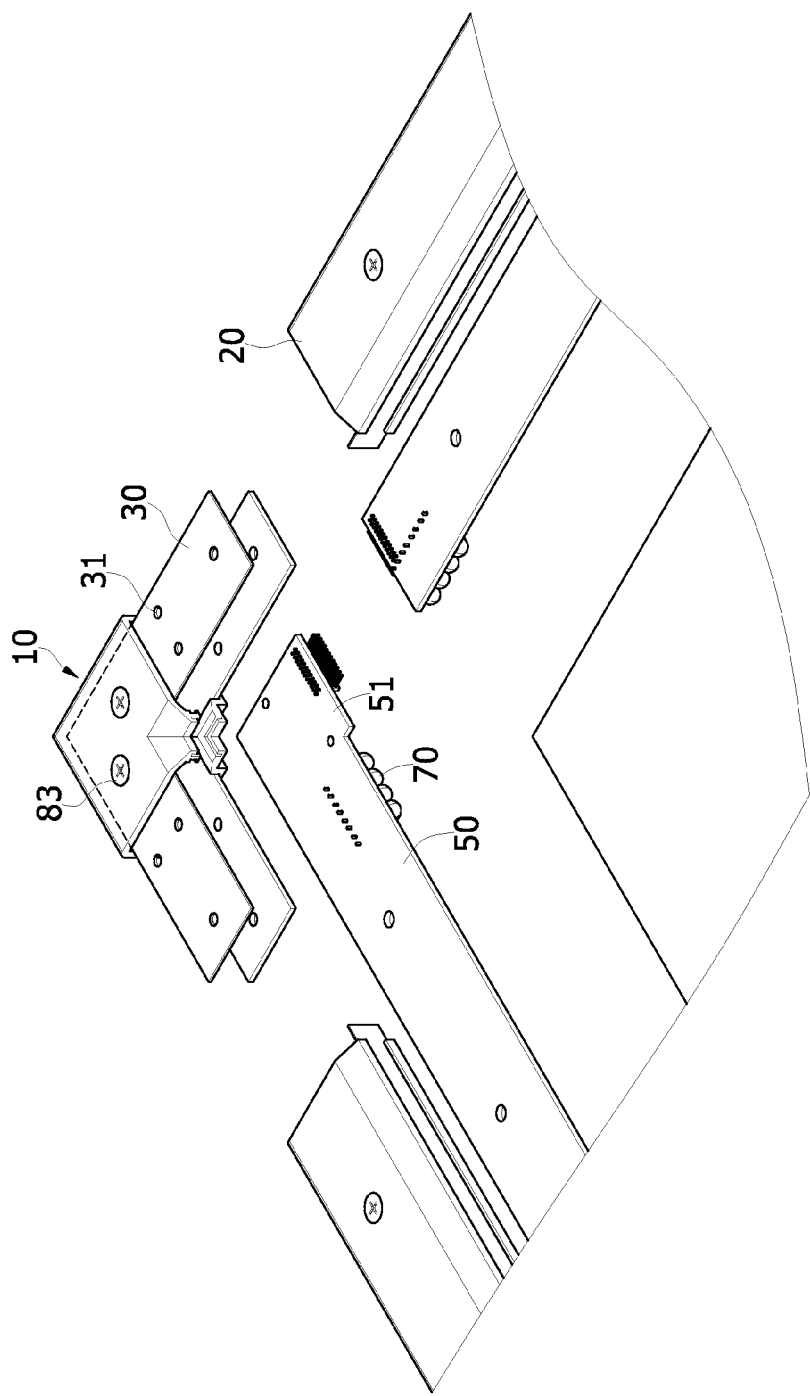
FIG. 8 is a perspective-view diagram showing the circuit board of an edge member connected to the circuit board of an adjacent edge member.
Figure 9:
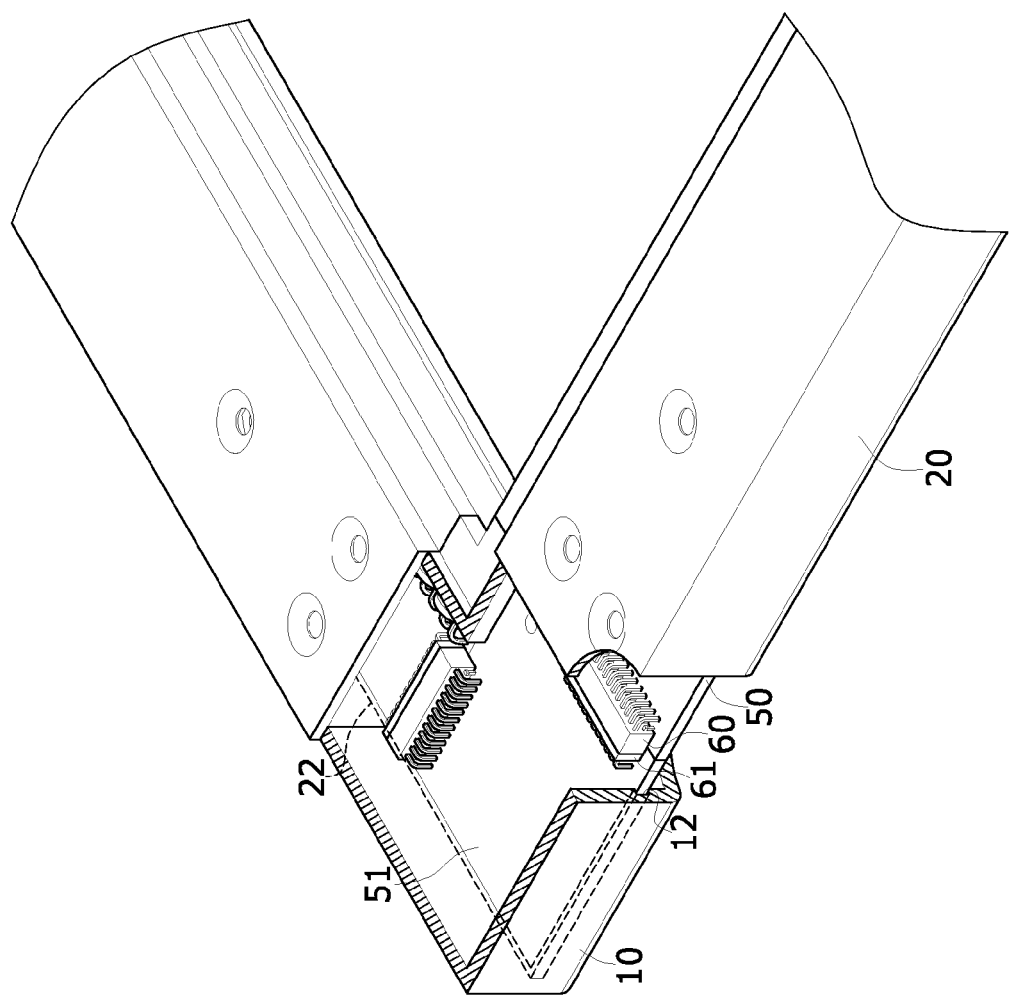
FIG. 9 is a perspective-view diagram showing a corner member joining two edge members.

As shown in FIGS. 3, 4, and 5, the spaces 11 and 21 of the corner members 10 and the edge members 20 could be used to accommodate a number of circuit boards 50 and 51, along with other relevant parts such as light projecting elements 70, as also shown in FIGS. 7 and 8. As shown in the circles A, B, and C of FIG. 3, the circuit boards 50 and 51 are cascaded by male and female connector 60 and 61 so that, even though the length of the edge members 20 may vary, an appropriate number of the circuit boards 50 could be perfectly fitted inside the space 21 of each edge member 20.

As shown in FIGS. 2, 3, 4, and 9, an outmost circuit board 50, held by the lateral troughs 12 of an edge member 10, is actually extended beyond the edge member 10. As the circuit board 51 inside a corner member 20 is held by the lateral troughs 22 that are aligned with the lateral troughs 12, when the edge member 10 is joined to a corner member 20 and the circuit board 50 is inserted into the corner member 20, the male and female connectors 60 and 61 of the circuit boards 51 and 50 are precisely aligned and therefore could be connected easily. In other words, the frame assembly of the present invention is not only easy to assemble and disassemble, but also could achieve easy electrical connection and disconnection for the circuit boards.

As shown in the circle D of FIG. 3 and FIG. 8, it is also possible to have a circuit board 51 to become a part of a circuit board 50 of an edge member 20. As such, the circuit board 50 could be directly connected to another circuit board 50 in an adjacent edge member 20 via the space 21 of an intermediate corner member 10, thereby reducing the number of parts of the frame assembly.

Figure 11:
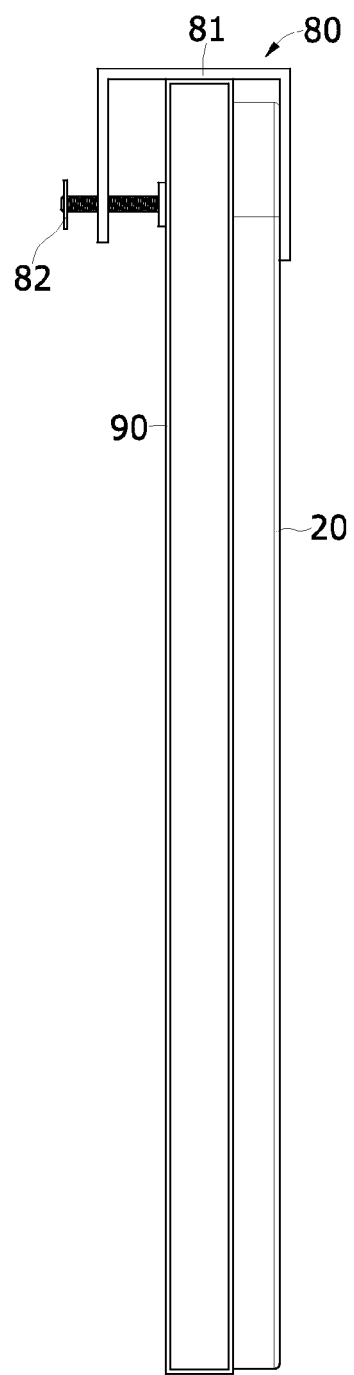
FIG. 11 is a side-view diagram showing a hook installed on the frame assembly of FIG. 1

As shown in FIG. 11, the frame assembly of the present invention could be further equipped with a number of hooks 80, each having a C-shaped body 81 and a clamping element 82 running through an arm (not numbered) of the body 81. An edge member 20, along with an edge of the touch panel 90, could be fitted inside the body 81 and the clamping element 82 is adjusted to press the edge member 20 and the edge of the tough panel 90 tightly against the other arm of the body 82. With the hooks 80, the frame assembly and the touch panel 90 could be reliably hanged on a wall or other vertical surface.

Figure 10:
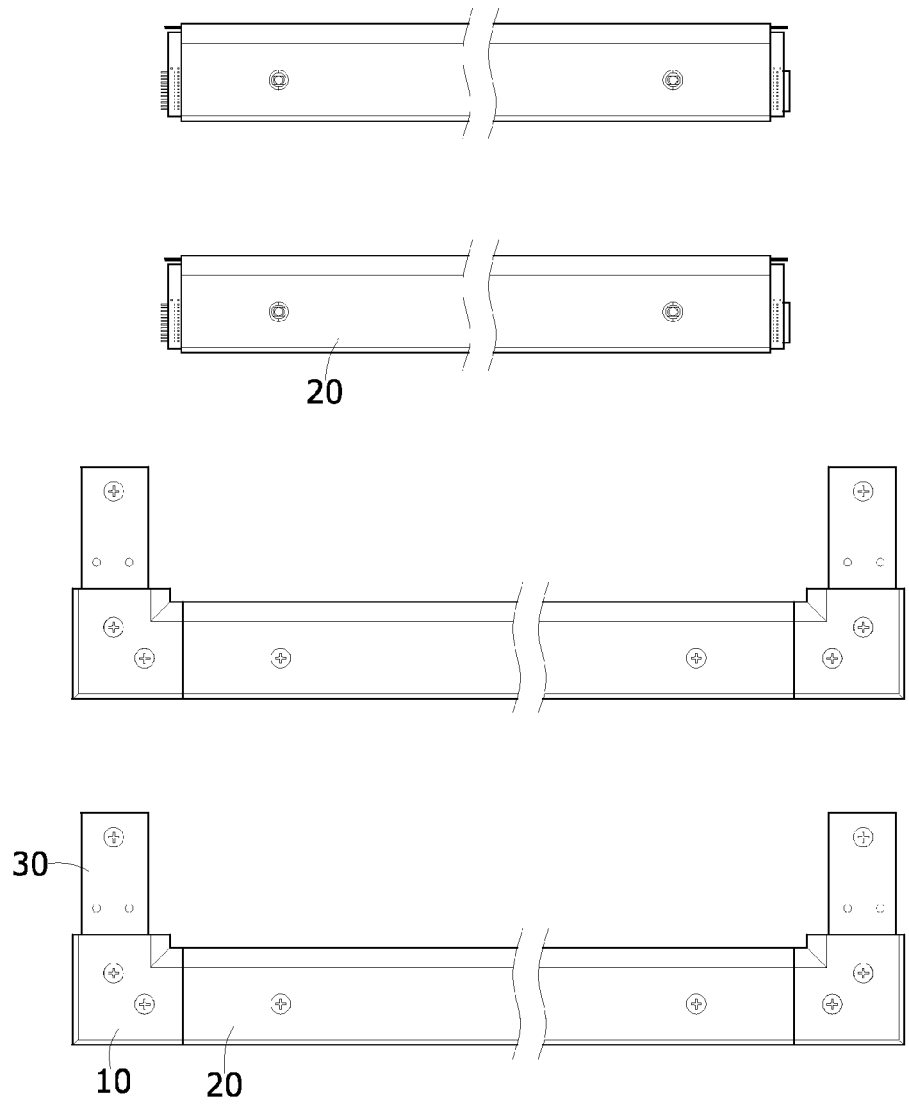
FIG. 10 is a front-view diagram showing the parts of the frame assembly of FIG. 1 for storage and transportation.

As shown in FIG. 10, the frame assembly could be disassembled into a number of standard-sized parts, which take up a significantly less amount of space both in storage and transportation. Additionally, due to its easiness in assembly and disassembly, the frame assembly and the touch panel are not required to be completely assembled together in one spot, contributing a greater manufacturing flexibility. Further more, despite that there are touch panels of various dimensions, a smaller number of parts for the frame assembly are required, reducing the production cost of the frame assembly significantly.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A frame assembly for a touch screen, comprising: a plurality of linear covering plates; a plurality of linear edge members, each edge member having a C-shaped cross section with an end-to-end linear opening along an inner side of each edge member for receiving an edge of said touch screen, said inner side of each edge member having a top half and a bottom half that close in towards each other from above and beneath said opening of each edge member, wherein, on a bottom surface of said top half and on a top surface of said bottom half of said inner side of each edge member, there are matching linear vertical troughs, respectively, for holding a covering plate sealing said opening of each edge member;

a plurality of L-shaped corner members connecting said edge members end-to-end into a rectangular frame surrounding said touch screen, each corner member having a C-shaped cross section and an L-shaped opening along an inner side of each corner member for receiving a corner of said touch screen, said inner side of each corner member having a top half and a bottom half that close in towards each other from above and beneath said opening of each corner member, wherein, on a bottom surface of said top half and on a top surface of said bottom half of said inner side of each corner member, there are matching L-shaped vertical troughs, respectively, for holding covering plates extended from adjacent edge members; and a plurality of flat connection pieces, each connection piece patching a corner member and at least an edge member together; A frame assembly for a touch screen, comprising: a plurality of linear covering plates; a plurality of linear edge members, each edge member having a C-shaped cross section with an end-to-end linear opening along an inner side of each edge member for receiving an edge of said touch screen, said inner side of each edge member having a top half and a bottom half that close in towards each other from above and beneath said opening of each edge member, wherein, on a bottom surface of said top half and on a top surface of said bottom half of said inner side of each edge member, there are matching linear vertical troughs, respectively, for holding a covering plate sealing said opening of each edge member;

a plurality of L-shaped corner members connecting said edge members end-to-end into a rectangular frame surrounding said touch screen, each corner member having a C-shaped cross section and an L-shaped opening along an inner side of each corner member for receiving a corner of said touch screen, said inner side of each corner member having a top half and a bottom half that close in towards each other from above and beneath said opening of each corner member, wherein, on a bottom surface of said top half and on a top surface of said bottom half of said inner side of each corner member, there are matching L-shaped vertical troughs, respectively, for holding covering plates extended from adjacent edge members; and a plurality of flat connection pieces, each connection piece patching a corner member and at least an edge member together, wherein, on an inner surface of said top half of said inner side of each corner member, there is an L-shaped lateral trough; there is another matching L-shaped lateral trough along an inner surface of an outer side of each corner member; said two lateral troughs are for holding a circuit board inside each corner member; on an inner surface of said top half of said inner side of each edge member, there is a linear lateral trough; there is another matching linear lateral trough along an inner surface of an outer side of each corner member; said two lateral troughs are for holding a circuit board inside each edge member.

2. The frame assembly according to claim 1, wherein at least a connection piece is L-shaped; said L-shaped connection piece is fitted inside a corner member with two legs extending out of said corner member to patch two edge members, respectively.

3. The frame assembly according to claim 1, wherein said covering plates are transparent.

4. The frame assembly according to claim 1, wherein said edge and corner members are made of aluminum and formed by extrusion.

5. The frame assembly according to claim 1, wherein said edge and corner members are made of a plastic material and formed by injection molding.

6. The frame assembly according to claim 1, wherein two connection pieces are used to patch a corner member and an edge member.

7. The frame assembly according to claim 1, wherein each connection piece has a plurality of through holes.

8. The frame assembly according to claim 1, wherein at least a connection piece is linear-shaped; and said connection piece is fitted inside a corner member with an end extending out of said corner member to patch an edge member.

9. The frame assembly according to claim 1, further comprising a plurality of hooks, each hook having a C-shaped body for receiving an edge member and an edge of said touch screen with a clamping element running through an arm of said body to press said edge member and said edge of said touch screen against the other arm of said body.

10. The frame assembly according to claim 1, further comprising a plurality of circuit boards, each having a plurality of connectors for cascading said connectors of adjacent circuit boards.

11. The frame assembly according to claim 1, wherein the corner member further comprises an L-shaped lateral trough on an inner surface of said top half of said inner side of each corner member, and another matching L-shaped lateral trough along an inner surface of an outer side of each corner member; said two lateral troughs are for holding a circuit board inside each corner member.

12. The frame assembly according to claim 10, wherein at least a circuit board is extended between a corner member and an edge member.

* * * * *